United States Patent [19]

Silva, Jr.

[11] 4,087,008

[45] May 2, 1978

[54] ADJUSTABLE TOW DOLLY

[76] Inventor: John Cruze Silva, Jr., P.O. Box 1082, Saugus, Mass. 01906

[21] Appl. No.: 681,234

[22] Filed: Apr. 28, 1976

[51] Int. Cl.² ............................................. B60P 3/12
[52] U.S. Cl. ................................. 214/86 A; 280/448
[58] Field of Search ............. 214/86 A; 280/448, 402

[56] References Cited

U.S. PATENT DOCUMENTS

| 2,674,464 | 4/1954 | Peterson | 280/448 X |
| 3,522,892 | 8/1970 | Vegors | 214/86 A |
| 3,559,827 | 2/1971 | Schier | 214/86 A |
| 3,841,506 | 10/1974 | Smith | 214/86 A |
| 3,843,093 | 10/1974 | Thompson et al. | 214/86 A X |

Primary Examiner—Robert G. Sheridan
Attorney, Agent, or Firm—Thomas C. Stover, Jr.

[57] ABSTRACT

A tow dolly for hauling motor vehicles is provided having a frame with a tow hitch mounted at the forward portion thereof, a pair of wheels mounted on the frame, a crane pivotably mounted on the frame above the axis of the wheels, a bumper bar mounted on the upper portion of the crane substantially parallel with the axis of the wheels and pivotably upwardly and downwardly on the crane, a pair of derrick arms pivotably mounted at the lower portion of the triangular frame, the free end portion of each derrick arm being connected to the bumper bar by a vehicle support strap, hooking means connected respectively to the bumper bar and the free end portions of said derrick arms, means for pivotably lowering the crane, bumper bar, derrick arms and hooks for engaging the vehicle at one end thereof and winching means for pivotably lifting and holding the crane and thus the bumper bar, derrick arms, hooks and the vehicle and upwardly with respect to said dolly wheels to enable towing of the vehicle.

12 Claims, 5 Drawing Figures

ADJUSTABLE TOW DOLLY

FIELD OF THE INVENTION

This invention relates to a towing apparatus, particularly a tow dolly for hauling vehicles.

THE PRIOR ART

The towing of vehicles including heavy vehicles, eg. motor vehicles, has often required a heavy and expensive tow truck particularly where an end of the vehicle must be lifted off the ground and the vehicle safely towed. The cost of acquiring such a tow truck has limited the ownership thereof and resulted in high tow charges for the motorist. Smaller tow dollys have been provided, which lift one end of the vehicle to be towed and which can be towed by auto or truck on a trailer hitch. See, for example, U.S. Pat. No. 3,825,132. However, such tow dollys back-up only with difficulty, jackknifing with the towed vehicle and scuffing of the dolly wheels.

There has heretofore not been a relatively light weight and inexpensive tow dolly, which resists jackknifing with its load and which tows well, forward and backward, while avoiding wheel scuffing and there is a need and market for such a tow dolly which substantially overcomes the above shortcomings.

There has now been developed a tow dolly for hauling vehicles, including motor vehicles, which is light weight; relatively low cost, which can lift and carry one end of a motor vehicle, hold such vehicle as a rigid towing unit and which provides for reversing the caster angle of its wheels so that such wheels will track towing forward as well as backward. Further, the loaded tow dolly can be balanced so there is virtually no load pressure up or down on the trailer hitch of the towing vehicle.

SUMMARY

There has now been developed a tow dolly for hauling vehicles comprising a support frame;

a plurality of dolly wheels rotatably mounted proximate the base of said frame;

a tow hitch mounted on the forward portion of said frame;

a crane pivotably mounted on said frame proximate the axes of said wheels and extending thereabove so as to pivot transversely to a line drawn between at least two of said wheels;

a bumper bar mounted on the upper portion of said crane fixed transversely substantially parallel with said line and pivotable downwardly and upwardly on said crane;

a plurality of hooking means mounted at spaced points on said bumper bar for securely engaging a vehicle;

means for pivotably lowering said crane, bumper bar and hooks for engaging said vehicle at one end thereof and winching means for pivotably lifting and holding said crane and thus the bumper bar, hooks and said vehicle end upwardly with respect to said dolly wheels to enable towing of said vehicle.

DESCRIPTION

The invention will become more apparent from the following detailed specification and drawing in which.

Figure 1:
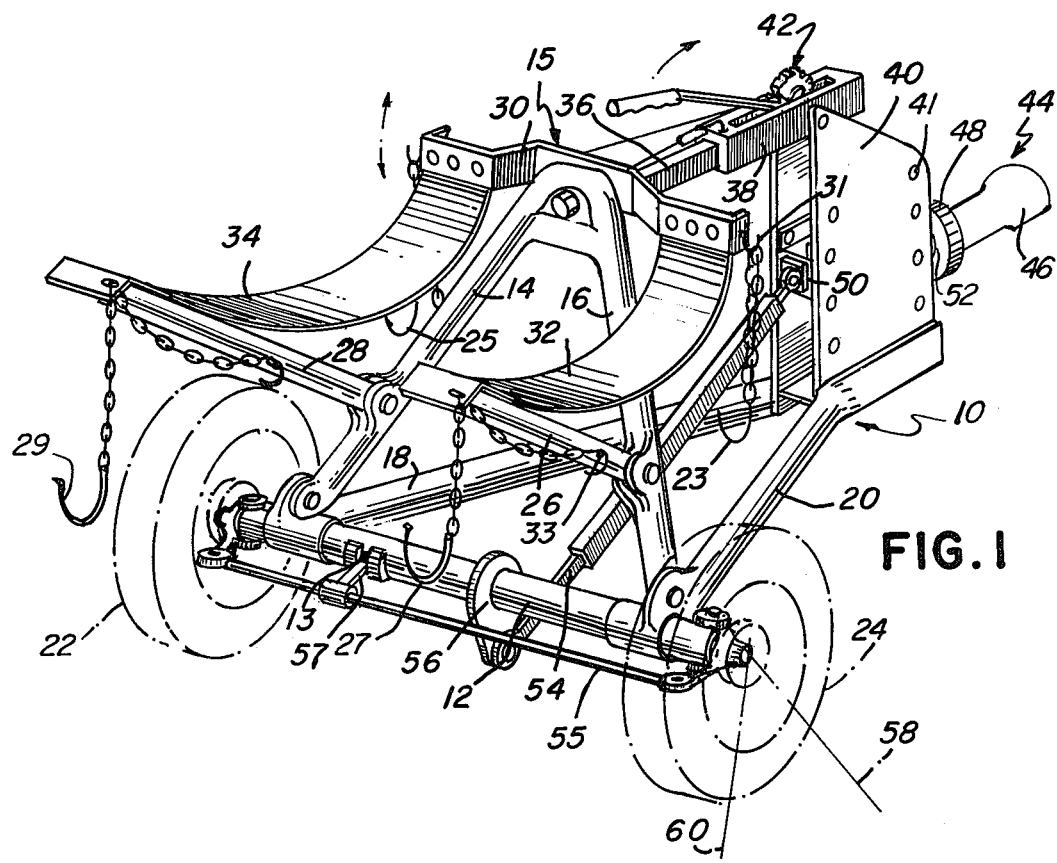
FIG. 1 is an isometric projection of a tow dolly embodying the present invention.
Figure 2:
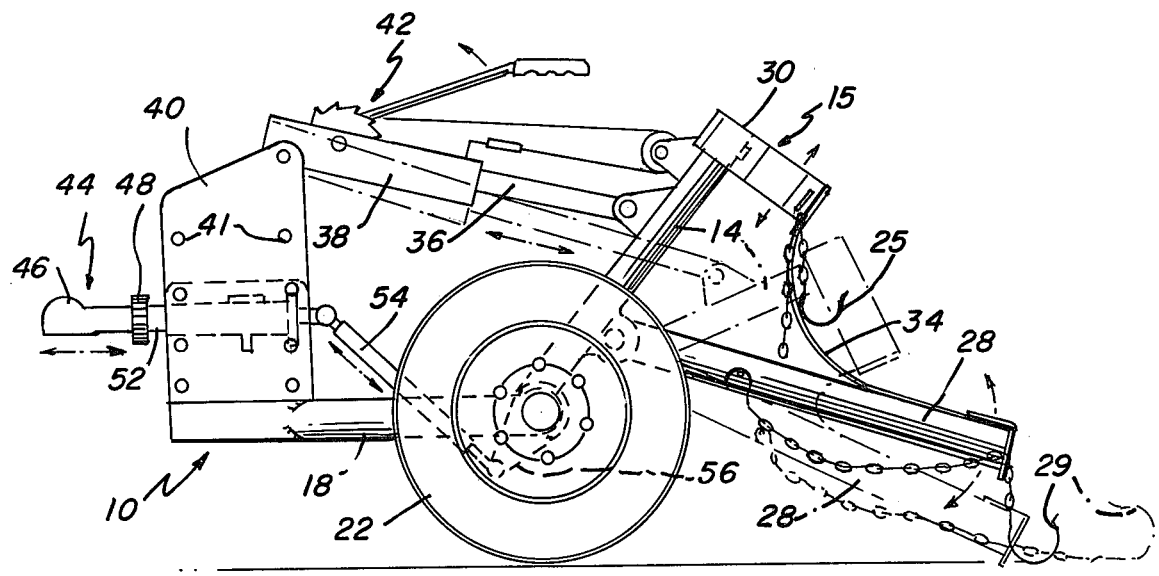
FIG. 2 is an elevation view of the tow dolly of FIG. 1 which includes said tow dolly in a lowered position.

Referring now to the drawings, tow dolly 10 has a rigid frame including triangular frame 15 bars 12, 14 and 16 as well as frame bars 18 and 20; the frame 12 additionally serving as an axle which rides on wheels 22 and 24, as shown in FIGS. 1 and 2. Attached to the triangular frame are pivotable derrick arms 26 and 28 which connect to laterally rigid bumper bar 30 by vehicle support straps 32 and 34, as shown in FIGS. 1 and 2. The bumper bar 30 is vertically pivotably mounted on the upright triangular frame 15, which frame is itself pivotably connected to telescoping jack bar 36, which telescopes into housing channel 38, which itself is pivotably mounted on frame hitch support 40, as shown in FIGS. 1 and 2. The telescoping bar 36 is cranked back and forth in the housing 38, by way of winch assembly 42, as shown in FIGS. 1 and 2.

Attached to the bumper bar 30, near the ends thereof are chains and hooks 23 and 25 and attached to derrick arms 26 and 28 are axle chain and hooks 27 and 29 as shown in FIG. 1. The chains are adjustable in length and are each secured by placing a link thereof over a hook, eg. hook 31 mounted on the bumper bar 30, and eg. hook 33 mounted on the derrick arm 26 as shown in FIG. 1.

Figure 4:
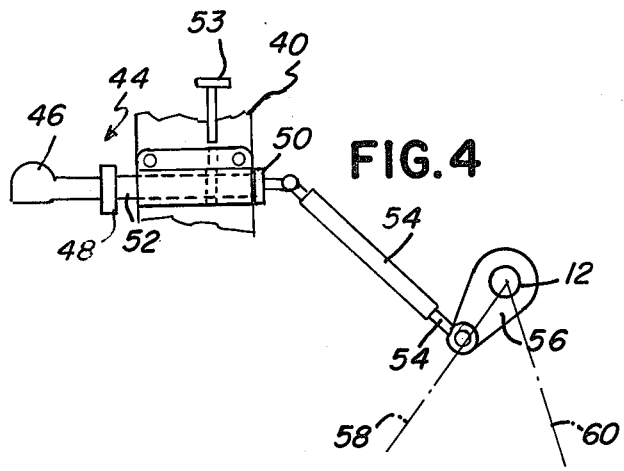
FIG. 4 is a fragmentary elevation view partly in schematic of a component of the tow dolly embodying the present invention.

Extending forward from the support upright 40 is adjustable caster dolly hitch assembly 44 wherein hitch arm 46, having stops 48 and 50 is axially movably mounted in the sleeve 52, which is mounted fixedly in upright frame brace 40, as shown in FIGS. 1, 2 and 4. The hitch arm 46 pivotably engages crank arm 54, which in-turn engages king pin adjustment lever 56, which pivots the king pins in their respective wheels 22 and 24 between a forward position angle 58 and a rearward position angle 60, as shown in FIGS. 1 and 4. Accordingly, when the hitch arm 46 is pulled forward (eg. by a tow vehicle) hitch 46 moves forward in the sleeve 52, until such sleeve is contacted by the stop 50 which pivots the caster arm 56 to the forward angle 58 shown in FIG. 4. When the hitch arm 46 is pushed rearwardly (eg. by a tow vehicle) it moves through the sleeve 52 until such sleeve engages stop 48 which, by crank arm 54, pivots the caster arm 56 to the rearward angle 60 changing the king pin of each wheel to the rearward position for rearward motion as indicated in FIG. 4.

The frame brace 40 has a series of apertures 41 permitting the dolly hitch sleeve 52 to be raised or lowered to the ball height of the towing vehicle while maintaining the tow dolly relatively level, as shown in FIG. 1.

Figure 3:
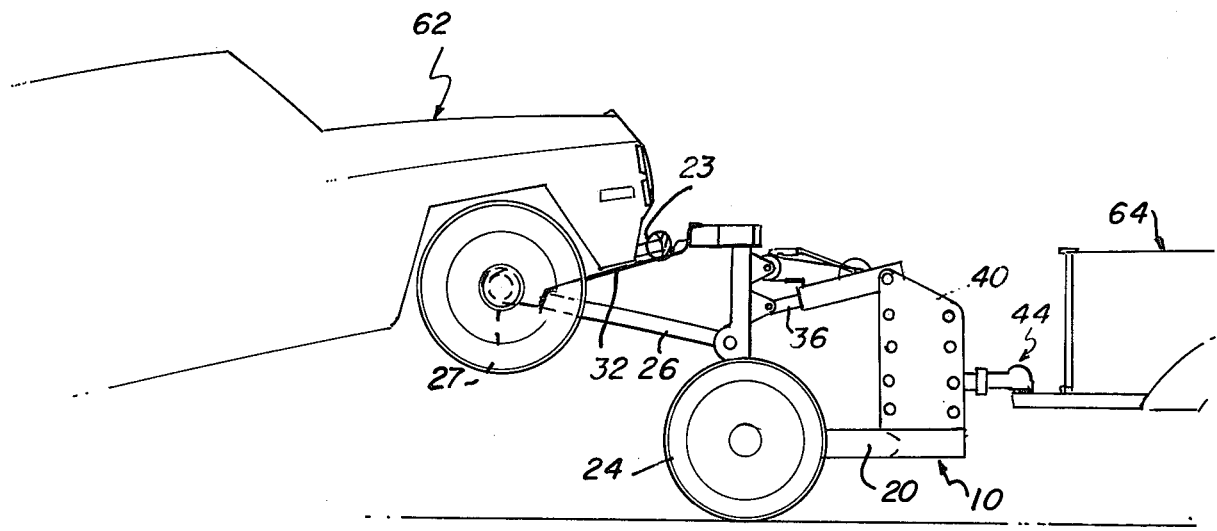
FIG. 3 is an elevation view of the tow dolly of FIG. 1 in use.

In operation, the tow dolly is winched to the down or pick-up position as shown by the arms 14 and 28 shown in phantom in FIG. 2. The tow dolly is then backed under either the front or rear end of the motor vehicle to be towed and positioned such that the bumper hooks 25 and 23 hook to bumper and/or adjacent structural member of the vehicle. Thus engaged, the winch and ratchet assembly 42 is activated and one end of the vehicle 62 is elevated as the triangular support 15, shown in FIGS. 1 and 2, is drawn upwardly toward the vertical position, as shown in FIGS. 2 and 3. As the end of the vehicle is elevated the belts bend around the bumper (or valance) of the vehicle and lift the derrick arms 26 and 27 upwardly under the vehicle suspension, so that the hooks 27 and 29 are then in position to be attached. The axle hooks 27 and 29 shown in FIGS. 1 and 2, are then hooked to the axle of the vehicle 62, as shown in FIG. 3.

At this point there is a lifting moment on the dolly hitch arm 46 due to the downward vector of the elevated vehicle 62. Then the winch assembly 42 is released which lowers slightly the elevated end of the vehicle 62 until the hook chains tighten and the vehicle end is supported solely by the axle hooks 27 and 29, bumper hooks 23 and 25 and the lifting straps 32 and 34 with little or no tension on the telescoping jack bar 36 and virtually no pressure upward or downward on the dolly hitch 46. Accordingly, dolly 10 and elevated vehicle 62 are held fast as a unit, as shown in FIG. 3.

Figure 5:
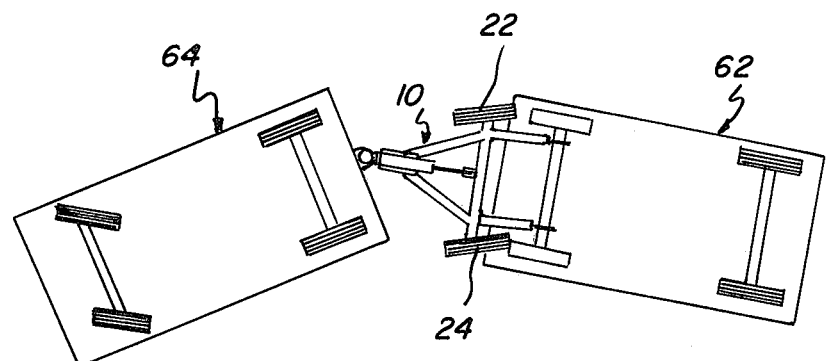
FIG. 5 is a bottom plan view of the tow dolly embodying the invention, in use.

The tow dolly 10 and the elevated vehicle 62, tow as a unit since the bumper bar 30, shown in FIGS. 1 and 2, pivots in the vertical plane but not the horizontal with respect to the triangular support frame 15 so that a towed vehicle is rigidly guided by the tow dolly in either forward or reverse, as shown in FIGS. 3 and 5. The transverse rigidity of the bumper bar 30, which prevents jackknifing of the elevated vehicle 62 and the dolly 10 is believed a novel feature of the tow dolly embodying the invention.

Another novel feature of the tow dolly 10 of the present invention is believed the means for automatic adjustment of the caster angle, as discussed above, with respect to FIG. 4. Accordingly, when a vehicle (eg. vehicle 62) is towed forward by eg. a tow truck 64, shown in FIG. 5, the dolly hitch arm 46 is pulled forward, cranking the king pin of the wheels 22 and 24 to the forward caster angle 58 shown in FIG. 4, enabling the dolly wheels 22 and 24 to follow the tow truck 64, as it moves ahead, readily turning without scuffing, in the manner of caster wheels on a supermarket shopping cart. On the other hand, when it is necessary to reverse direction and back the dolly 10 and elevated vehicle 62 both shown in FIG. 5, the dolly wheels 22 and 24, tend to scuff and resist turning, if the caster angle of the king pins of such wheels remain in the forward caster angle position 58, shown in FIG. 4. Fortunately according to a second novel feature of the tow dolly of the present invention, the rearward pressure on the dolly hitch arm 46 shifts such hitch arm through the sleeve 52 and cranks the king pins of the wheels 22 and 24 into the rear caster angle position 60, shown in FIG. 4, which enables the wheels 22 and 24, to readily turn and follow the turning arc applied to the elevated vehicle by the backing tow truck 64, without scuffing, as shown in FIG. 4.

Accordingly, the towing dolly of the present invention includes three novel features discussed at length above summarized as (1) the transversely rigid bumper bar 30, which, however, is allowed to pivot in the vertical plane (for cases where the towed vehicle runs over a bump), (2) the automatically adjustable caster angle of the dolly wheels, which enables dolly and towed vehicle to be equally towed forward or backward while avoiding scuffing and turning problems of the dolly wheels and (3) the tow dolly of the invention, when loaded, can be balanced with no substantial upward or downward pressure on the trailer hitch as hereinafter discussed.

From the above it can be seen that the tow dolly of the invention provides effective towing of heavy vehicles forward and backward with a comparatively light-weight, low cost unit.

The shape of the frame of the tow dolly embodying the present invention can be varied from angular to rounded or a combination thereof and take any convenient strong yet light-weight shape desired. Preferably, the shape of the frame is triangular for maximum strength with a minimum of structural members. For example, the frame hitch support 40, illustrated in FIG. 1, can be considerably more compressed than shown, or the hitch 46 can be mounted higher up on the frame support 40.

The frame of the tow dolly of the invention can be made of various rigid structural material, eg. wood, metal and heavy duty plastic and the like. However, metal, eg. steel or aluminum is desired for durability and strength in lifting and towing heavy vehicles.

The tow dolly embodying the invention has a plurality of wheels, i.e. at least two, as illustrated in the drawings and can have additional wheels where advantageous for strength and load distribution purposes.

The bumper bar 30 shown for example in FIG. 1 can take various shapes and lengths provided it pivots only in the substantially upward-downward plane and not the substantially horizontal plane as discussed above. Such tow bar then provides rigidity in towing and backing a vehicle on the tow dolly of the invention while avoiding jacknifing at such bumper bar as occurs in the towing apparatuses of the prior art. However, the vertical pivoting of the bumper bar provides towing flexibility to allow, for example, the towed vehicle to ride over bumps without destabilizing the towing system embodied in the tow dolly of the invention.

Derrick bars 26 and 28 can take various shapes and sizes which should be of a length sufficient to reach under the end of the vehicle to be lifted and towed, and provide suitable anchorage for hooks to be attached thereto, to engage the axle of such vehicle.

The bumper bar of the invention is connected to the derrick arms by at least one heavy duty towing strap or belt which, as discussed above, contours around the lifted end of the vehicle for secure carrying and towing thereof. Preferably at least two such belts are employed, eg. belts 32 and 34 as illustrated in FIG. 1. Where desired more than two belts can be employed and connected between the bumper bar and the derrick bars of the tow dolly of the invention.

Additionally, at least a pair of bumper hooks are attached to the bumper bar to engage the bumper of the vehicle to be lifted and towed. If desired, one or more such bumper hooks can be employed and secured to the bumper bar. The bumper and axle hooks are desirably connected by chains to their respective points of anchorage, while chains are adjustable in length to insure tight gripping of respectively the bumper and axle of the vehicle to be lifted and towed. When a hook is adjusted to its proper chain length, the chain is secured by eg. by hooking a chain link over a hook mounted on the tow dolly frame, bumper bar or derrick arms, as convenient.

The winching means as illustrated in FIGS. 1 and 2 is desirably a ratchet and pawl assembly which is connected to block and tackle means, as illustrated in FIG. 2 or can be connected to gear means or a threaded jack bar which, like the typical automobile jack can be cranked back and forth in a housing under a heavy load.

Various other winching means will suggest themselves within the scope of the invention including hydraulic and turnbuckle, winching or lifting means and the like.

The hitch arm-crank arm king pin shifting assembly which shifts the caster angles of the wheels via the king pins from forward to rearward is desirably, as shown, a sleeve and positive stop lever mechanism which responds to forward and rearward (push and pull) pressure. However, other king pin shifting means can be employed including electrical, hydraulic, screw thread gear shifting (eg. a worm gear tangentially contacting a spur gear around the gear mechanism), to accomplish such caster angle shift. Such caster angle shift systems can respond to push-pull pressure, button or lever, which is activated by the tow dolly operator.

The dolly hitch arm can be locked against shifting manually, eg. by insertions of a bolt 53 through the sleeve 52 of FIG. 4 or electronically, along with the tie rod, so that when the tow dolly is towed to a destination it follows like a conventional trailer. In addition, the caster angle is prevented from shifting each time the tow dolly stops.

The tow dolly wheels 22 and 24 are desirably connected with a tie rod 55 as shown in FIG. 1, so that the dolly wheels will turn, pivot and track in concert, eg. parallel for controlled backing and towing of the vehicle. Provision is made for anchoring the tie rod 55 in place by means of tie rod stem 57 which engages a groove 13 in the axle 12 to maintain the dolly wheels in fixed relationship, eg. as in towing an unloaded dolly to a destination. When however it is wished to employ the tow dolly under load in turning, either in the backward or forward direction, the tie rod stem 57 is disengaged from the slot 13 in the axle 12 to permit such dolly wheels, eg. wheels 22 and 24, as shown in FIG. 1, to readily track according to the direction of turning of the towed vehicle.

As discussed above and illustrated in FIG. 3, the vehicle to be towed is engaged by the respective bumper and axle hooks and the bumper bar is winched to the near vertical position raising one end of the towed vehicle over the dolly wheels, the bumper hooks and fender (or suspension) hooks and straps securely engaging the vehicle. Thereupon the winch is uncranked permitting the telescoping bar 36, the triangular frame 15 and the bumper bar 30 to lower slightly which permits the lifted end of the vehicle to lower against the supporting hooks and chains and lifting straps rendering such lifting hooks, and chains and straps taut against the vehicle. Thereafter, all pressure can be taken off the winching means and thus off the tow dolly hitch 36 since the lifted end of the vehicle and the tow dolly are now tightly secured as a unit, leaving neither upward nor downward pressure therefrom on such trailer hitch 46, all as illustrated in FIG. 3. Thus the loaded and balanced tow dolly of the invention can readily be unhitched from one towing vehicle and hitched to another or merely detached from a towing vehicle and pushed by hand around a garage or parking lot for future service as desired.

Accordingly, the tow dolly of the invention can readily be loaded with the vehicle to be towed, by hand operation. Such tow dolly can be readily attached to virtually any motor vehicle with a trailer hitch thereon, eg. an auto or truck before or after loading the tow dolly of the invention and the loaded or unloaded tow dolly towed forward and backward at will. The tow dolly of the invention can alternatively be loaded with the vehicle to be towed, lifted and secured by hand, where desired and pushed around by hand as above stated, or engaged to a suitable towing means such as a horse or motor vehicle where desired. Accordingly, the tow dolly of the invention provides a low cost, light weight unit, available at relatively low cost and operable by various towing means providing great convenience (including the freeing of a tow truck for other duties) and affordability to the motorist as well as the small and large garage owner.

What is claimed is:

1. A tow dolly for hauling vehicles comprising, a support frame; a plurality of dolly wheels rotatably mounted proximate the base of said frame; a tow hitch mounted at the forward position of said frame; a crane pivotably mounted on said frame proximate the axes of said wheels and extending thereabove so as to pivot transversely to a line drawn between at least two of said wheels; a bumper bar mounted on the upper portion of said crane fixed transversely substantially parallel with said line and pivotable downwardly and upwardly on said crane; a plurality of hooking means mounted at spaced points on said bumper bar for securely engaging a vehicle; a pair of derrick arms pivotably mounted at the lower portion of the frame, the free end portion of each derrick arm being connected to said bumper bar by a vehicle support strap; means for pivotably lowering said crane, bumper bar, derrick arms, and hooks for engaging said vehicle at one end thereof and winching means for pivotably lifting and holding said crane and thus the bumper bar, derrick arm, hooks and said vehicle end upwardly with respect to said dolly wheels to enable towing of said vehicle.

2. The tow dolly of claim 1 wherein said hooking means includes at least one strap attached to said bumper bar, said strap hanging downwardly and at least one hook attached to the lower portion of said strap for engaging said vehicle.

3. The tow dolly of claim 2 wherein a pair of spaced straps are (attached) connected, one from each derrick arm to opposite ends of said bumper bar.

4. The tow dolly of claim 1 wherein a hook is connected to each free end portion of said derrick arms.

5. The tow dolly of claim 4 wherein adjustable length chain connects the hooks respectively to the bumper bar and the derrick arms.

6. The tow dolly of claim 1 wherein said winching means includes a lever, ratchet and pawl.

7. The tow dolly of claim 1 having means to adjust the caster angle of said wheels.

8. The tow dolly of claim 7 wherein each dolly wheel is mounted on an axle and secured by a kingpin mounted in said axle, a lever arm is attached at one end to said tow hitch and at the other end to said kingpins, said arm shifting forward when pull pressure is applied to said hitch and shifting rearward when push pressure is applied to said hitch to shift the caster angle of said kingpins respectively forward and rearward to permit ready tracking and turning of said dolly wheels in both directions.

9. The tow dolly of claim 1 wherein a tie rod connects said dolly wheels to permit tracking and turning thereof in parallel.

10. The tow dolly of claim 1 having means for locking said tie rod when the unloaded unit is towed to a destination.

11. The tow dolly of claim 4 wherein the bumper bar hooks engage the bumper of said vehicle, said winding means lift said bumper and one end of said vehicle, causing said straps to contact and curve under the adjacent axle of the proximate wheels of said vehicle and causing said derrick arms to rise under axle, means for attaching the derrick hooks to said axle and means for unwinching said crane partially until the vehicle load is taken up by said crane straps, bumper bar, derrick arms and said dolly wheels, transferring the load from said winching means and thus from said tow hitch to provide a balanced and loaded tow dolly.

12. The tow dolly of claim 11 wherein each dolly wheel is mounted on an axle and secured by a kingpin mounted in said axle, a lever arm is attached at one end to said tow hitch and at the other end to said kingpins, said arm shifting forward when pulled pressure is applied to said hitch and shifting rearward when push pressure is applied to said hitch, to shift the caster angle of said kingpins respectively forward and rearward to permit ready tracking and turning of said dolly wheels in both directions.

* * * * *